May 16, 1950     H. H. CLAASSEN     2,507,770
TRANSDUCER FOR ULTRASONIC WAVES
Filed June 25, 1948
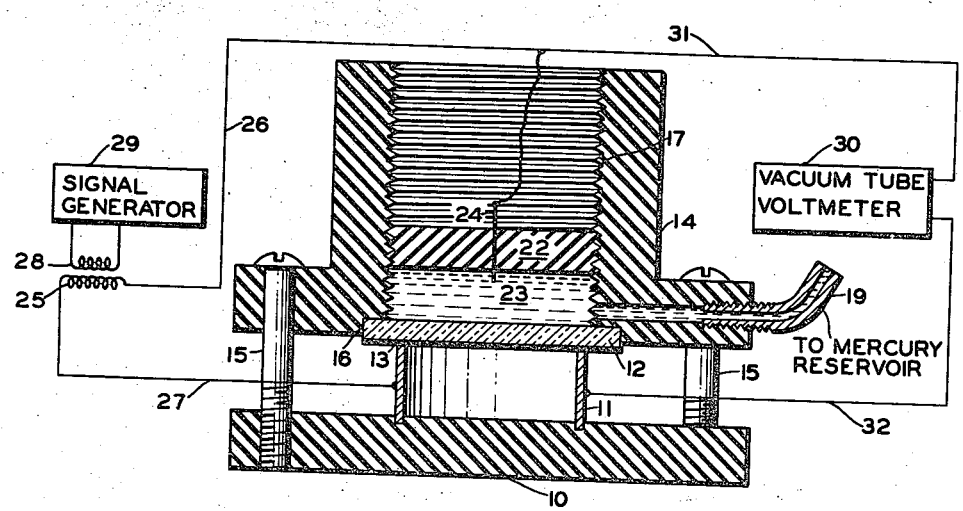
INVENTOR.
H. H. CLAASSEN
BY
ATTORNEYS Patented May 16, 1950

2,507,770

UNITED STATES PATENT OFFICE 2,507,770

TRANSDUCER FOR ULTRASONIC WAVES

Howard H. Claassen, Norman, Okla., assignor to Phillips Petroleum Company, a corporation of Delaware Application June 25, 1948, Serial No. 35,249

5 Claims. (Cl. 171—327)

This invention relates to a method of and apparatus for generating and receiving ultrasonic waves. In a more specific aspect, it relates to such a generator or receiver in which the frequency of the ultrasonic waves may be readily varied.

In many types of testing equipment, it is desirable to have a source of ultrasonic waves whose frequency may be continuously varied throughout a wide range and, further, to provide a receiver for ultrasonic waves whose frequency of greatest sensitivity may be varied in a similar manner. For example, in the measurement of the absorption or velocity spectrum of material for supersonic waves, the provision of such a transmitter and receiver is quite important.

It is an object of my invention to provide a method for transmitting and receiving supersonic waves of varying frequency.

It is a further object of the invention to provide apparatus for transmitting and receiving supersonic waves of variable frequency.

It is a still further object of the invention to provide such apparatus which is simple in construction, reliable in operation, of rugged construction, and which is economical to manufacture.

Various other objects, advantages and features of the invention will become apparent from the following detailed description taken in conjunction with the accompanying drawing, in which the figure is a vertical sectional view of a supersonic wave generator constructed in accordance with the invention.

Referring now to the drawing in detail, the apparatus comprises a base 10 of insulating material upon which is mounted a metal ring 11, preferably of brass, which serves as one electrode of the generator. A piezoelectric crystal 12, or other member which is adapted to vibrate at supersonic frequencies, is carried by the electrode 11 and, in order to obtain intimate contact between these parts, an aluminum film may be evaporated upon the face 13 of the crystal which is contacted by the ring 11. An annular member 14 of insulating material is spaced from the base 10 by screws 15 and the lower portion of the member 14 is recessed, as indicated at 16, to fit tightly against the crystal 12. A screw threaded axial passage 17 is formed in the member 14 and this passage constitutes a reservoir for receiving liquid material, preferably mercury, which is admitted through a bore communicating with a conduit 19 leading to a mercury reservoir.

A plug 22 is screw threaded in the passage 17, this plug being formed of insulating material and controlling the height of the mercury layer 23 as the plug is threaded into and out of the passage 17. The plug 22 carries an electrode 24 which engages the mercury body 23 but which is spaced from the adjacent face of the crystal 12.

A transformer secondary winding 25 is connected to the electrodes 11, 24 by leads 26, 27 and the primary winding 28 of this transformer is fed by a signal generator 29, whose frequency may be varied as desired. As an optional feature, a vacuum tube voltmeter 30 may be connected across the electrodes 11, 24 by leads 31 and 32.

In accordance with the invention, when an alternating voltage of supersonic frequency is applied to the electrodes 11 and 24, the crystal 12 and mercury body 23 vibrates as a unit at a resonant frequency determined by the combined width of the crystal and the mercury body. This results from the fact that the absorption and reflection of sound waves from the crystal by the mercury layer takes up only about 2 to 7 per cent of the total energy produced by the vibrating crystal, and the rest of the energy is transmitted by the mercury layer. This energy dissipation differs with the materials defining the interface and other materials, in general, dissipate more energy at the interface than the mercury, quartz crystal combination. Consequently, as the height of the mercury layer is changed by adjustment of the plug 22, the resonant frequency of the unitary mercury-crystal body is similarly varied, thereby changing, in a corresponding manner, the frequency of the ultrasonic waves produced by the vibrations of the unit. It will be apparent that the plug 22 may be continuously or intermittently moved to vary, as desired, the frequency of the ultrasonic waves produced by the current applied to the electrodes 11 and 24.

The described apparatus is also capable of use as a tuned receiver of ultrasonic waves. To this end, signal generator 29 and transformer 25, 28 are replaced by the tuned input circuits of a suitable receiver which is capable of operation as supersonic frequencies. Thereupon, supersonic waves incident upon the mercury-crystal structure will produce a voltage which is picked up by the receiver and suitably amplified to actuate a recorder or other similar device. The amplitude of the recorded voltage is, of course, a maximum at the resonant frequency of the mercury crystal unit and the resonance peak of said unit is sufficiently sharp that the receiver may be readily tuned to the frequency of the supersonic waves incident thereupon.

It is also to be understood that various changes and modifications may be made in the described structure without departing from the spirit and scope of the invention. For example, it is sometimes desirable to provide a mercury body of variable thickness and permit the piezoelectric crystal to float upon the mercury body, suitable electrodes being provided for feeding the current to the mercury-crystal unit. I specifically include this modification within the scope of the invention as well as various other changes in the size, structure, and operation of the invention which will be apparent to those skilled in the art.

Having described my invention, I claim:

1. In combination, a member adapted to vibrate at ultrasonic frequencies, said member having a resonant frequency, a body of conductive liquid in intimate contact with one face of said member, an electrode in contact with another face of said member, and another electrode spaced from said member and engaging said liquid body.

2. In combination, a piezoelectric crystal, a body of mercury in intimate contact with one face of said crystal, an electrode in contact with the other face of said crystal, and another electrode spaced from said crystal and engaging said body of mercury.

3. A variable frequency transducer comprising, in combination, a base, a piezoelectric crystal supported by said base, means defining a liquid reservoir with said crystal, a body of mercury in said reservoir contacting one face of said crystal, an electrode contacting the other face of said crystal, another electrode spaced from said crystal and engaging said body of mercury, means for applying an alternating voltage of supersonic frequency to said electrodes, thereby to effect unitary vibration of said crystal and said mercury, and means for varying the depth of said body of mercury, thereby to change the resonant frequency at which said vibrations occur.

4. A variable frequency transducer comprising, in combination, a base of insulating material, a ring of conductive metal mounted on said base, a piezoelectric crystal mounted on said ring, an annular member formed from insulating material mounted on said base and having its lower region in engagement with said crystal, said member having an axial threaded passage formed therein, means for introducing mercury into said passage so that said mercury contacts one face of the crystal, a plug screw threaded in said passage for varying the amount of mercury contained therein, and an electrode carried by said plug and engaging said body of mercury, said electrode being spaced from said crystal.

5. The method of producing ultrasonic vibrations which comprises maintaining a mercury layer in contact with a piezoelectric crystal, applying an alternating voltage between opposite ends of the unitary body thus formed to produce vibrations thereof at supersonic frequencies, and varying the thickness of said mercury layer thereby to change the resonant frequency of said unitary body.

HOWARD H. CLAASSEN.

REFERENCES CITED

The following references are of record in the file of this patent:

UNITED STATES PATENTS

| Number | Name | Date |
| --- | --- | --- |
| 2,423,306 | Forbes et al. | July 1, 1947 |